No. 685,037. Patented Oct. 22, 1901.
J. W. DURHAM.
BEDSTEAD BRACE.
(Application filed Mar. 16, 1901.)
(No Model.)
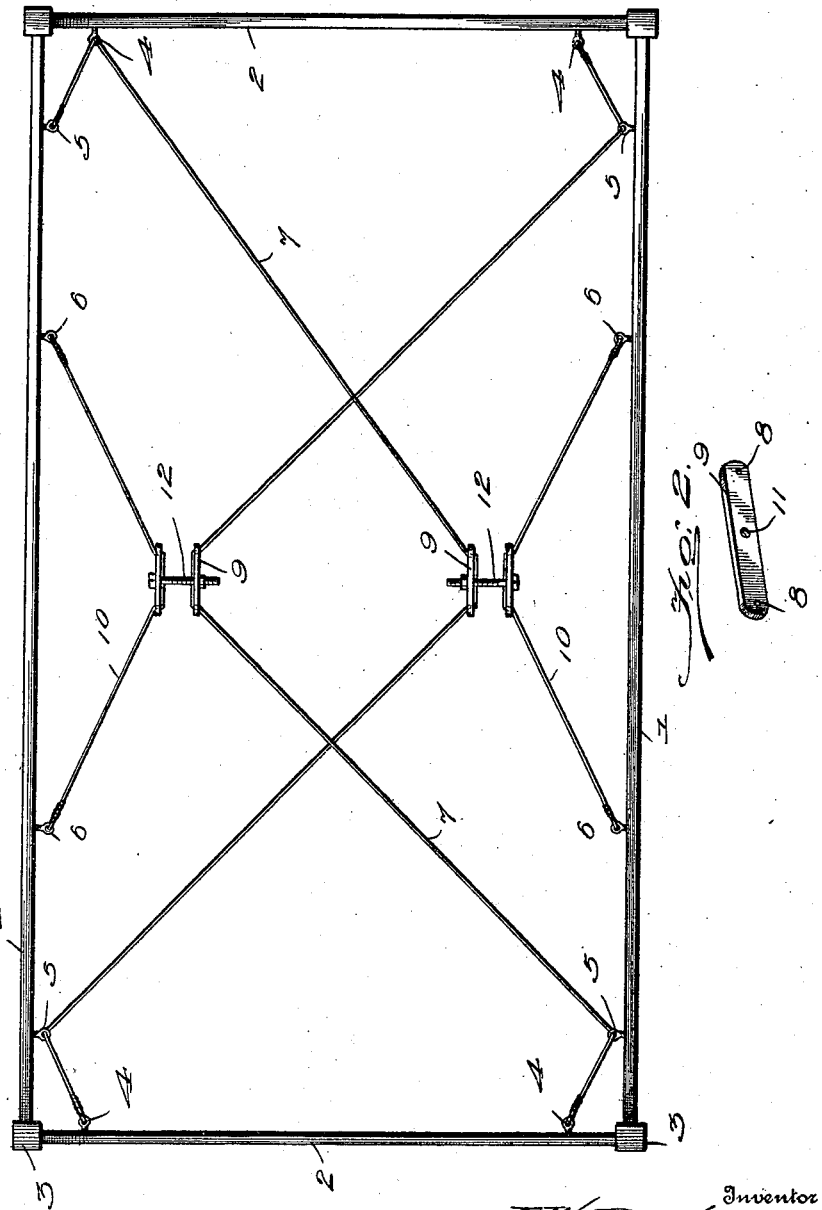

UNITED STATES PATENT OFFICE.

JOHN W. DURHAM, OF CARUTHERSVILLE, MISSOURI.

BEDSTEAD-BRACE.

SPECIFICATION forming part of Letters Patent No. 685,037, dated October 22, 1901.

Application filed March 16, 1901. Serial No. 51,501. (No model.)

*To all whom it may concern:*

Be it known that I, JOHN W. DURHAM, a citizen of the United States, residing at Caruthersville, in the county of Pemiscot and State of Missouri, have invented new and useful Improvements in Furniture-Braces, of which the following is a specification.

This invention relates to new and useful improvements in braces for furniture, and is more especially adapted for use upon beds. Its primary object is to provide a device of simple and durable construction which may be readily secured to the frame of a bed and which will securely bind the parts together and prevent spreading.

With these and other objects in view the invention consists in the novel construction and combination of parts hereinafter more fully described and claimed and illustrated in the accompanying drawings, showing the preferred form of my invention, in which—

Figure 1 is a plan view of the brace in position upon a bed-frame, and Fig. 2 is a detail view of one of the clamp-plates.

Referring to the drawings by numerals of reference, 1 1 are the side rails, and 2 2 are the ends rails, of a bed, these rails being secured to posts 3. Heavy eye-screws 4 are secured to each end rail 2, near the ends thereof, while similar screws 5 and 6 are secured to the side rails 1 near their ends and centers, respectively. A cable or wire 7 is fastened to one of the screws 4 of one of the end rails and passes through the adjacent eye-screw 5. Said cable then extends through apertures 8, formed within a plate 9, through the eye-screw 5 upon the same side as the one in which the cable has already been placed, and is then secured to the adjacent screw 4. A second cable 7 is secured in a similar manner to the end rails and to the opposite side rail of the bed. The eyes 6 are connected by cables 10, which pass through plates 9, similar to those heretofore referred to, and these plates, as well as the plates on the cables 7, have apertures 11 for the reception of clamping-bolts 12. Each bolt engages the plate on one cable 10 and one cable 7, and it will be understood that by tightening the bolts the rails will be drawn toward each other by the cables and securely held in such position. The cables 7 hold the rails in position in the posts 3 and in conjunction with cables 10 prevent bulging or spreading of the side rails.

In the foregoing description I have shown the preferred form of my invention; but I do not limit myself thereto, as I am aware that modifications may be made therein without departing from the spirit or sacrificing any of the advantages thereof, and I therefore reserve the right to make all such changes as fairly fall within the scope of my invention.

Having thus fully described my invention, what I claim as new, and desire to secure by Letters Patent, is—

1. The combination with the posts and side and end rails, of eyebolts secured adjacent to the ends of the side rails, long cables secured at their ends to the end rails and loosely fitted in the eyebolts, short cables secured adjacent to the centers of the side rails, and means for drawing the long cable of one side rail toward the short cable of the remaining side.

2. The combination with posts and side and end rails, of eyebolts secured adjacent to the ends of the side rails, long cables secured at their ends to the end rails and loosely fitted in the eyebolts, short cables the ends of which are secured at opposite sides of the centers of the side rails, plates secured upon the cables and having apertures therein, bolts within the apertures, and nuts thereon whereby the long cables are adapted to be drawn toward the oppositely-arranged short cables.

JOHN W. DURHAM.

Witnesses:
JOHN RICHARDS,
C. GARRETT.